(12) United States Patent
Johnson et al.

(10) Patent No.: US 8,016,530 B2
(45) Date of Patent: Sep. 13, 2011

(54) PANEL FASTENER

(75) Inventors: Lawrence W. Johnson, Taylor, MI (US); William S. Pippine, Waterford, MI (US)

(73) Assignee: Illinois Tool Works Inc., Glenview, IL (US)

( * ) Notice: Subject to any disclaimer, the term of this patent is extended or adjusted under 35 U.S.C. 154(b) by 397 days.

(21) Appl. No.: 12/268,224

(22) Filed: Nov. 10, 2008

(65) Prior Publication Data

US 2009/0180842 A1 Jul. 16, 2009

Related U.S. Application Data

(60) Provisional application No. 61/020,178, filed on Jan. 10, 2008.

(51) Int. Cl.
*F16B 37/04* (2006.01)
(52) U.S. Cl. ............ 411/173; 411/182; 411/463
(58) Field of Classification Search .......... 411/55, 411/173, 182, 463, 516, 520
See application file for complete search history.

(56) References Cited

U.S. PATENT DOCUMENTS

| | | | | |
|---|---|---|---|---|
| 1,436,027 | A * | 11/1922 | Ferris | 285/137.11 |
| 2,010,519 | A * | 8/1935 | Jones | 411/520 |
| 2,560,961 | A * | 7/1951 | Knohl | 411/173 |
| 2,720,135 | A * | 10/1955 | Gisondi | 411/61 |
| 4,610,588 | A | 9/1986 | Van Buren, Jr. et al. | |
| 4,925,351 | A * | 5/1990 | Fisher | 411/182 |
| 5,873,690 | A * | 2/1999 | Danby et al. | 411/55 |
| 6,095,734 | A | 8/2000 | Postadan et al. | |
| 7,568,870 | B2 * | 8/2009 | Paquet | 411/177 |
| 7,874,775 | B2 * | 1/2011 | Hullmann et al. | 411/173 |
| 2008/0286066 | A1 | 11/2008 | Paquet | |

FOREIGN PATENT DOCUMENTS

| | | |
|---|---|---|
| DE | 102006001741 A1 | 8/2007 |
| DE | 102006019256 A1 | 10/2007 |
| GB | 2162272 A | 1/1986 |
| WO | WO 2006127288 A | 11/2006 |

OTHER PUBLICATIONS

International Search Report and Written Opinion for PCT/US2008/084837.

* cited by examiner

*Primary Examiner* — Flemming Saether
(74) *Attorney, Agent, or Firm* — Mark W. Croll; Paul F. Donovan

(57) ABSTRACT

A nut fastener adapted for insertion into an opening in a panel. The nut fastener includes a platform including an upper face and a lower face. A sleeve defining a sleeve axis extends through the platform. The sleeve includes a sleeve inlet opening at the upper face adapted to receive an elongate fastening member along the sleeve axis. A first retention arm extends downwardly from a first position on the platform. At least a second retention arm extends downwardly from a second position on the platform. The first position and the second position are disposed on substantially opposing sides of the sleeve axis. The first retention arm and the second retention arm are adapted to rotate to outboard locking positions upon insertion of the elongate fastening member.

19 Claims, 7 Drawing Sheets

PANEL FASTENER

CROSS-REFERENCE TO RELATED APPLICATION

This Application claims benefit of U.S. Provisional Application Ser. No. 61/020,178 filed Jan. 10, 2008, the contents of which are hereby incorporated by reference as if fully set forth herein.

FIELD OF THE INVENTION

The present invention relates generally to a panel fastener, and more particularly, to a mid-panel nut for push-in relation within an opening in a panel and adapted to receive a bolt, screw or other elongate male connector element. The panel fastener engages the panel and is locked in place by spreading of displaceable retention arms.

BACKGROUND OF THE INVENTION

There are many situations in which panels have openings located inwardly of the edges to which it would be desirable to adhere other equipment or panels. A desirable system for accomplishing this would be the provision of a nut that could be readily positioned within the opening and self-lock on receiving a securing bolt or screw therein. This is especially desirable in those situations in which access is substantially confined to one side of the panel and where there is no easy mechanism for tightening or otherwise securing or adjusting the nut position from the opposite side of the panel. These situations are frequently encountered, for example, in modern automotive vehicles.

SUMMARY OF THE INVENTION

The present invention relates to a self-locking panel nut fastener. In particular, the present invention relates to a nut for being received within an opening in a panel that self-locks and upon receiving a threaded screw or bolt enhances the locking relationship with the panel.

According to one exemplary feature, a nut fastener adapted for insertion into an opening in a panel is provided. The nut fastener includes a platform including an upper face and a lower face. A sleeve defining a sleeve axis extends through the platform. The sleeve includes a sleeve inlet opening at the upper face adapted to receive an elongate fastening member along the sleeve axis. A first retention arm extends downwardly from a first position on the platform. At least a second retention arm extends downwardly from a second position on the platform. The first position and the second position are disposed on substantially opposing sides of the sleeve axis. The first retention arm and the second retention arm include biasing arms normally projecting away from inboard surfaces towards the axis line. The biasing arms are adapted to engage the elongate fastening member during insertion through the sleeve and facilitate rotation of the retention arms to outboard locking positions.

According to another exemplary feature, a nut fastener adapted for insertion into an opening in a panel is provided. The nut fastener includes a platform including an upper face and a lower face. A sleeve defining a sleeve axis extends through the platform. The sleeve includes a sleeve inlet opening at the upper face adapted to receive an elongate fastening member along the sleeve axis. A multi-segment elongate rib member is disposed in spanning relation to the sleeve inlet opening. The multi-segment elongate rib member has a side to side concave profile across the upper face. The elongate rib member includes a first segment and a second segment opening into opposing sides of the sleeve inlet opening. A first retention arm of flexible character extends downwardly from a first position adjacent a first lateral edge of the platform. A second retention arm of flexible character extends downwardly from a second position adjacent a second lateral edge of the platform. The first lateral edge and the second lateral edge are on substantially opposing sides of the sleeve axis.

DETAILED DESCRIPTION OF THE PREFERRED EMBODIMENTS

Figure 1:
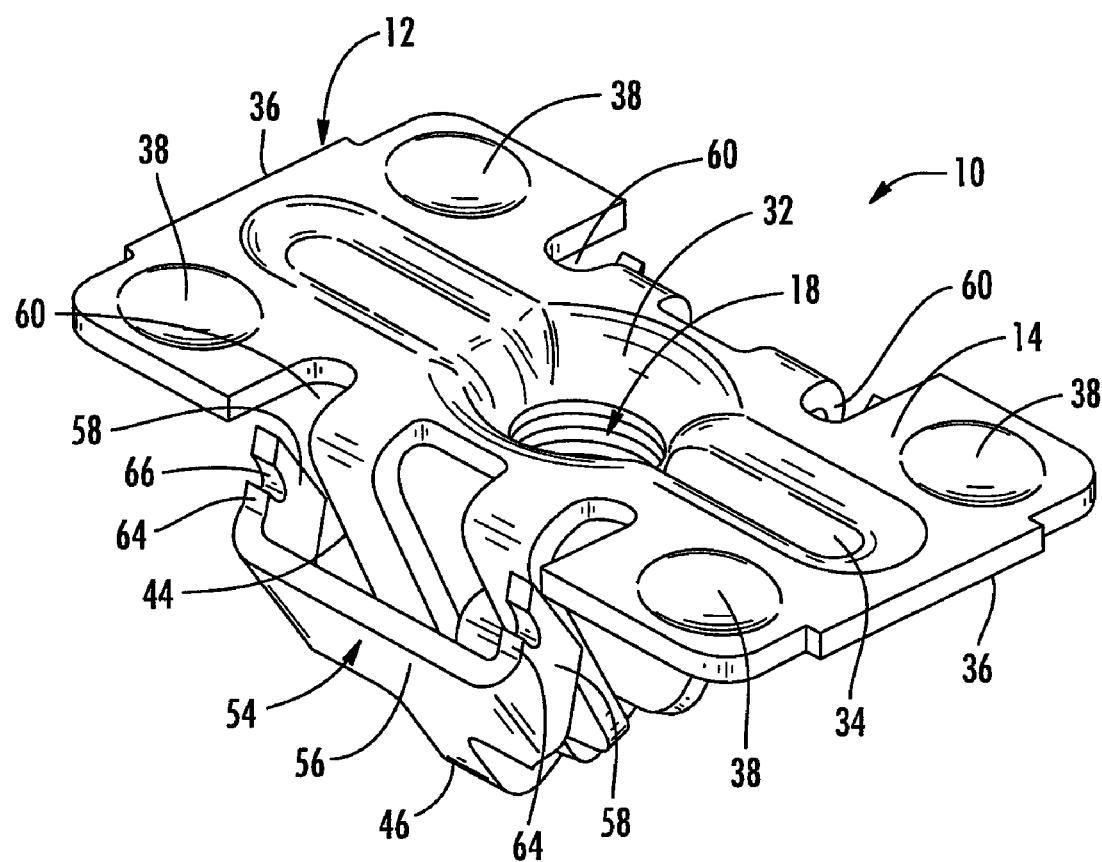
FIG. 1 illustrates a side overhead view of a push-in nut fastener.
Figure 2:
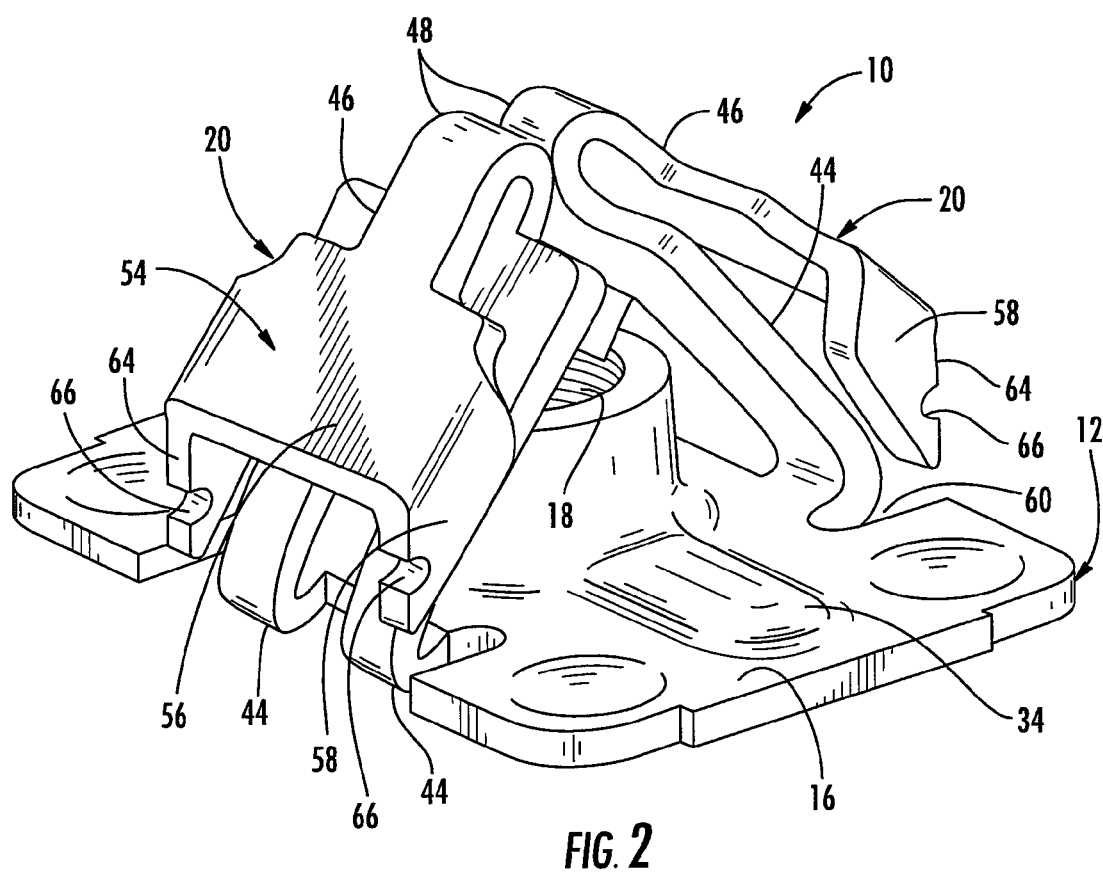
FIG. 2 is a view illustrating the underside of the nut fastener illustrated in FIG. 1.

Reference will now be made to the drawings, wherein to the extent possible, like elements are designated by like reference numerals throughout the various views. Referring jointly to FIGS. 1 and 2, a push-in nut fastener 10 is illustrated. As shown, the nut fastener 10 includes a platform 12 defining an upper face 14 and a lower face 16. A sleeve 18 having a threaded interior extends through the platform 12 and projects outwardly from the lower face 16. A pair a retention arms 20 (FIG. 2) are disposed along opposing lateral sides of the platform 12. The retention arms 20 are adapted to lockingly engage a panel member following insertion of the nut fastener 10 in a manner as will be described further hereinafter.

The nut fastener 10 may be formed from any suitable material as may be known to those of skill in the art. By way of example only, and not limitation, such materials may include metals, plastics, wood, ceramics or mixtures thereof. Sheet metal such as steel or the like, may be desirable in some applications. The use of spring steel may be particularly desirable for many uses.

Figure 3:
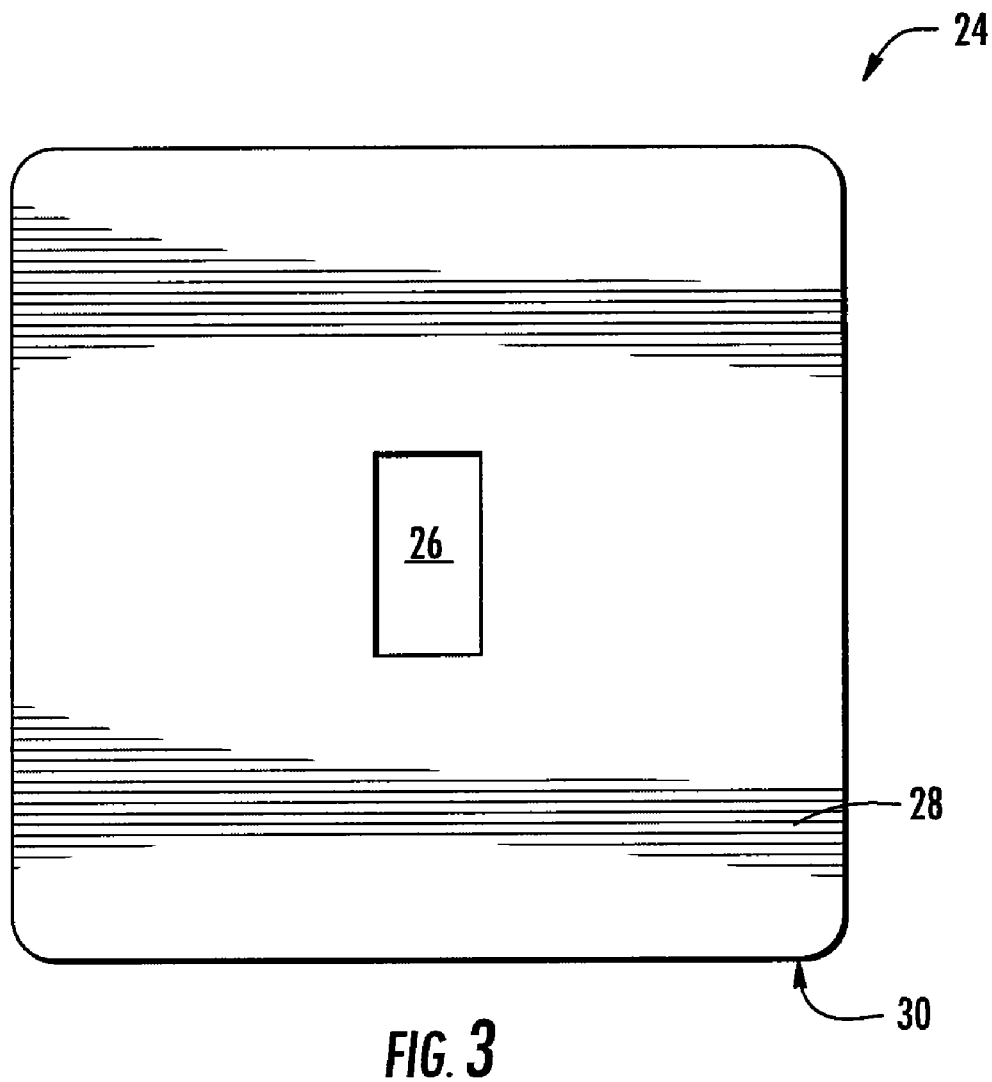
FIG. 3 is an overhead view of a panel including an opening for acceptance of a nut fastener.
Figure 4:
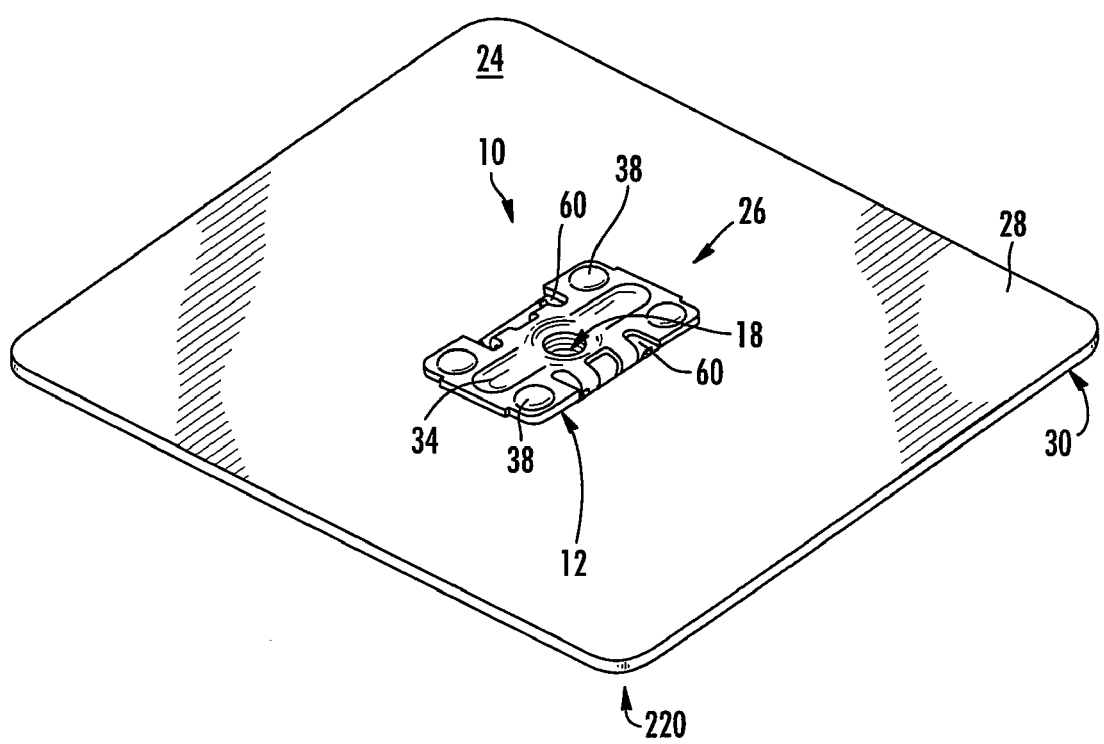
FIG. 4 is a side overhead view of the push-in nut fastener of FIG. 1 secured within the panel of FIG. 3.

FIG. 3 illustrates an exemplary panel 24 adapted for insertion of the exemplary nut fastener 10. As shown, the exemplary panel 24 includes a panel opening 26 extending between a panel upper surface 28 and a panel lower surface 30 thereby defining pass through across the panel 24. FIG. 4 illustrates the push-in nut fastener 10 secured within the exemplary panel 24. In particular, the nut fastener 10 is disposed in inserted relation into the panel opening 26 such that the sleeve 18 and the retention arms 20 are pushed to a position below the upper panel surface 28. In this inserted configuration, the platform 12 is disposed above the upper panel surface 28 in juxtaposed spanning relation to the panel opening 26.

Referring again to FIGS. 1 and 2, the nut fastener 10 includes a draw opening depression 32 disposed at the upper face 14 of the platform 12 in circumferentially surrounding relation to the sleeve 18. As shown, the draw opening depression 32 is generally bowl shaped including sloped sides extending in converging relation towards the axis of the sleeve 18. In the illustrated exemplary configuration, the nut fastener 10 further includes a multi-segment elongate stiffening rib 34 extending in transverse spanning relation to the draw opening depression 32. In the illustrated configuration, the stiffening rib 34 includes a pair of opposing segments projecting outwardly away from opposing sides of the draw opening depression 32 towards opposing distal edges 36 of the platform 12. As shown, the interior surfaces of the stiffening rib segments have a generally concave, scalloped profile from side to side with generally rounded end sections with surfaces sloping towards the base of the rib.

In the illustrated arrangement, the segments of the stiffening rib 34 open into, and converge with, the draw opening depression 32. The converging intersection of the segments of the stiffening rib 34 with the draw opening depression 32 provides enhanced stabilization to the platform 12. In particular, the stiffening rib 34 acts to distribute forces outwardly from the draw opening depression 32 thereby aiding in the prevention of bowing upon application of force by a bolt or screw inserted into the sleeve 18 during an attachment procedure as will be described further hereinafter. As will be appreciated, while a single stiffening rib having two substantially equivalent segments is shown, it is likewise contemplated that other configurations of stiffening ribs having other configurations may likewise be utilized if desired.

Figure 6:
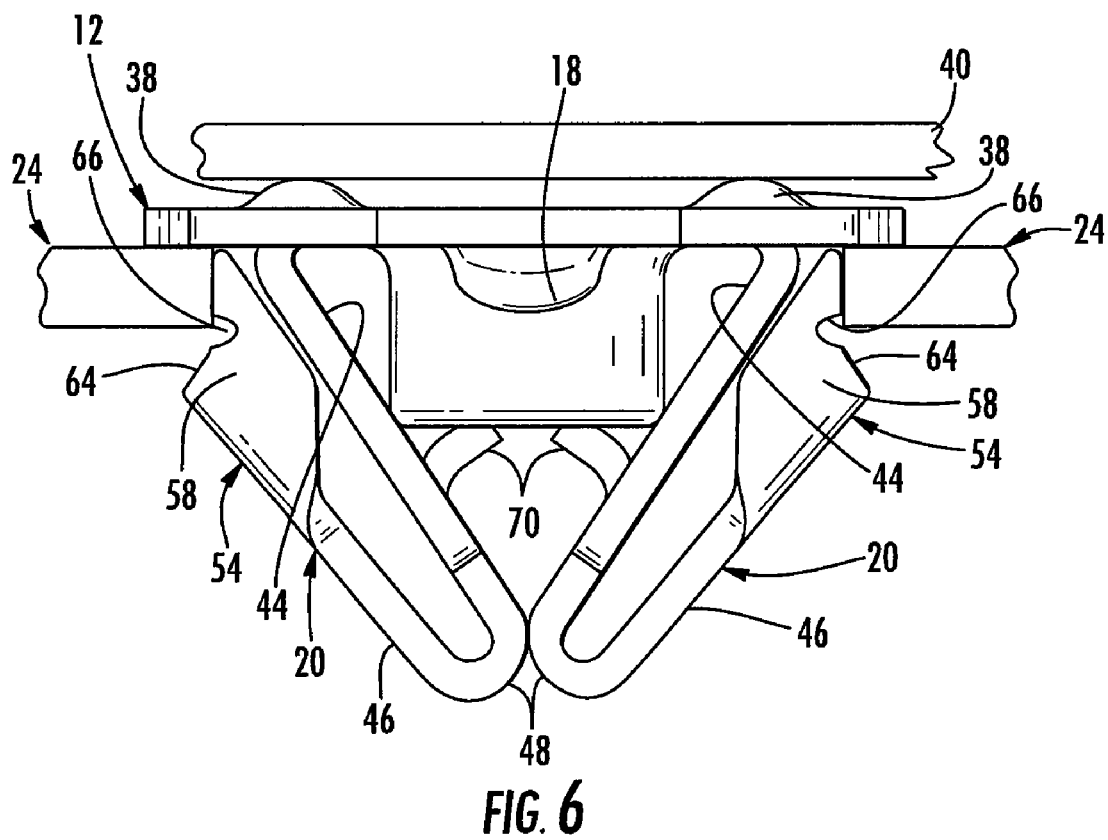
FIG. 6 illustrates a cross-sectional end view of the nut fastener illustrated in FIG. 1 inserted within a panel.

As shown, the exemplary platform 12 further includes an arrangement of raised dimples 38 projecting outwardly from the upper face 14. As best illustrated in FIG. 6, such dimples 38 act as stanchions to provide spacing between the upper face 14 of the platform 12 and a covering panel 40 as may be applied in a manner as will be described further hereinafter. Such spacing permits the application of protective coatings between the nut fastener 10 and the covering panel 40 to aid in corrosion resistance or the like, as may be desired.

Figure 5:
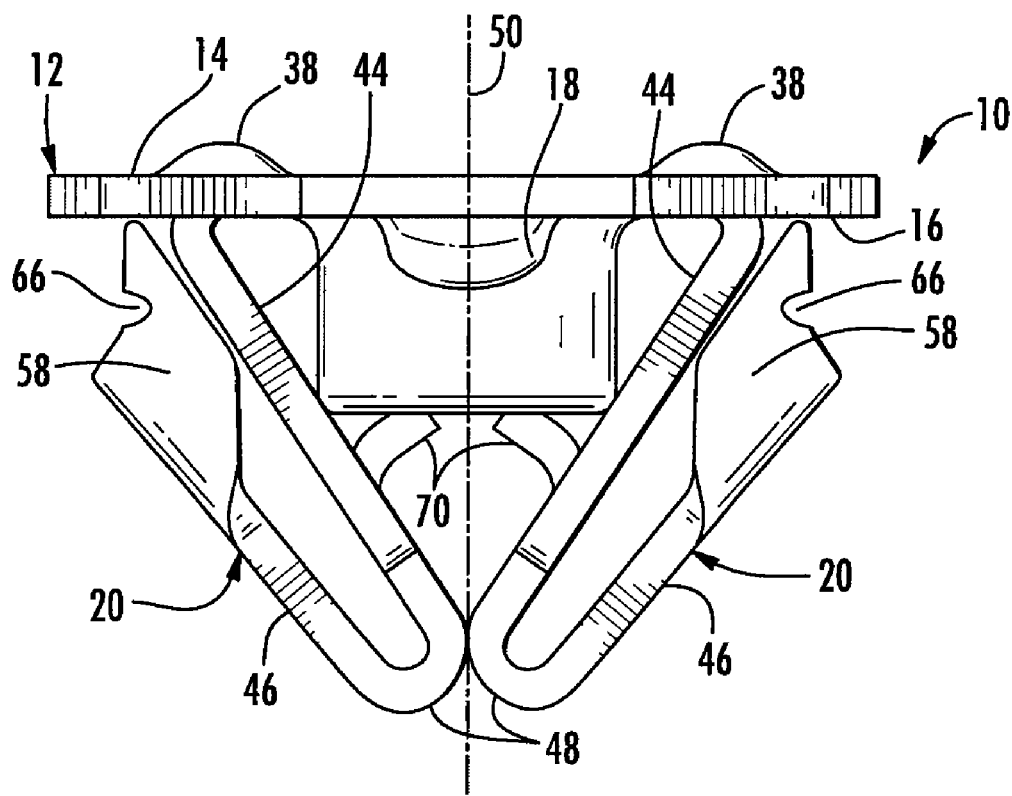
FIG. 5 is a cross-sectional end view of the nut fastener illustrated in FIG. 1.

As noted previously, the nut fastener 10 includes a pair of retention arms 20 disposed along lateral edges of the platform 12 in outboard relation to the sleeve 18. Referring jointly to FIGS. 1, 2, and 5, in the exemplary construction the retention arms are characterized by a generally "U" shaped cross-sectional profile. This U-shaped profile is defined by an inboard arm segment 44 and an outboard arm segment 46. The inboard arm segment 44 and the outboard arm segment 46 are connected by an intermediate elbow segment 48.

As best seen in FIG. 5, in the illustrated construction, the retention arms 20 are operatively connected to the platform 12 by the inboard arm segments 44. The inboard arm segments 44 extend in generally converging angled relation away from the lower face 16 towards and axis line 50 running through the sleeve 18. The outboard arm segments 40 extend in diverging relation angled away from the axis line 50. In the illustrated exemplary construction, the outboard arm segments 46 are generally free to move relative to the inboard arm segments 44 thereby permitting the outboard arm segments 46 to be compressed towards the inboard arm segments 44 during insertion of the nut fastener 10 through the panel opening 26. In this regard, the intermediate elbow segment 48 may act as a spring member to facilitate inward movement of the outboard arm segment 46 to an extent required during insertion through the panel opening 26 and to thereafter bias the outboard arm segment 46 to an outward position once insertion is complete.

As best seen in FIGS. 1 and 2, the outboard arm segments 46 include a terminal head portion 54 of extended width. The terminal head portion 54 includes a cross member 56 generally defining a T-shaped configuration with the lower portion of the outboard arm segment 46. The terminal head portion 54 further includes a pair of lateral wing segments 58 disposed on either side of the cross member 56. As shown, the lateral wing segments project in a generally inboard direction towards the inboard arm segments 44. As best seen in FIGS. 1 and 2, the lateral wing segments 58 are disposed generally in a plane aligned with cutouts 60 along the lateral edges of the platform 12. As will be appreciated, such alignment of the lateral wing segments 58 with the cut outs 60 facilitate the ability to compress the outboard arm segments 46 towards the inboard arm segments 44 during insertion of the nut fastener 10 into the panel opening 26 without encountering interference by the platform 12.

As shown, in the exemplary construction, the lateral wing segments 58 include panel engagement zones 64 extending in raised angled relation relative to the cross member 56. The panel engagement zones 64 are oriented to engage the panel 24 following insertion and locking of the nut fastener 10. As illustrated, the panel engagement zone 64 may include a notch 66 which engages at least a lower portion of the panel 24 when the nut fastener 10 is locked into place.

Figure 7:
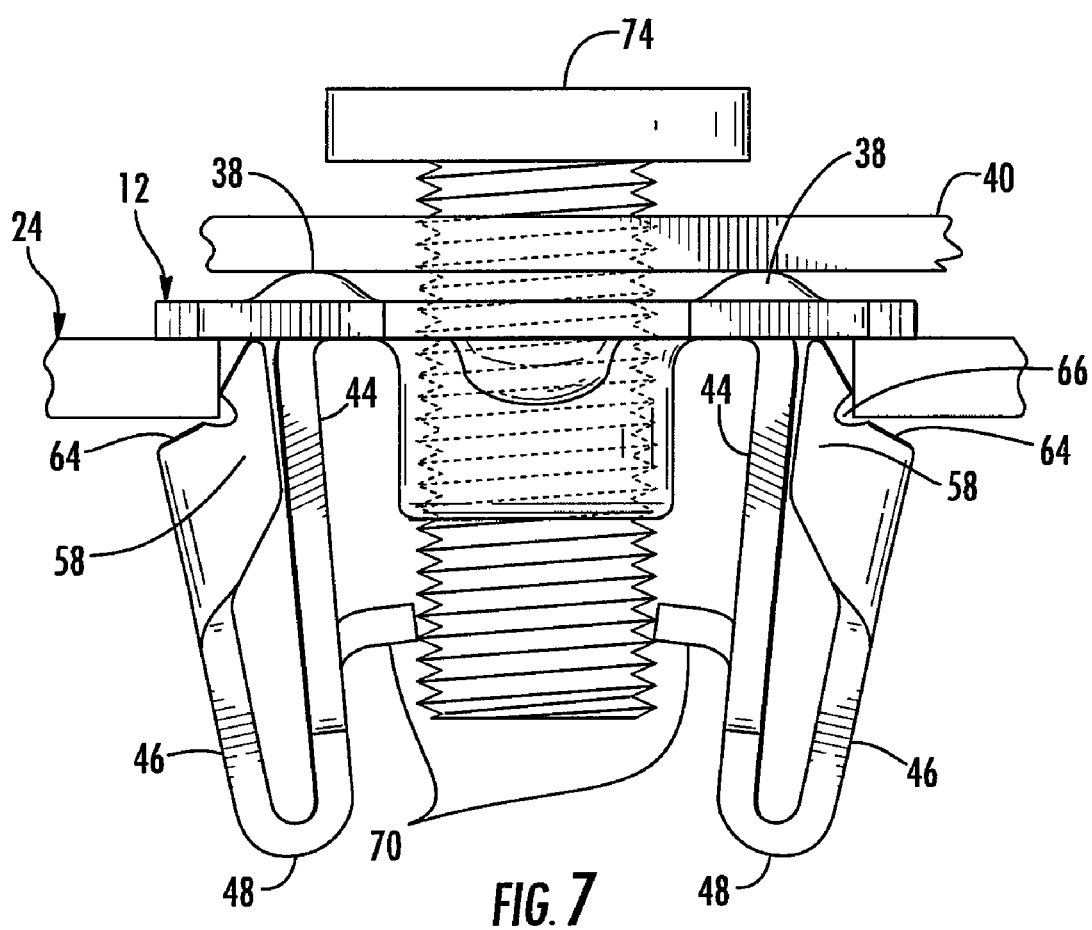
FIG. 7 is a view similar to FIG. 6, illustrating the nut fastener in locked position within a panel.

As best illustrated in FIGS. 5, 6, and 7, the exemplary nut fastener 10 includes biasing arms 70 projecting away from inner surfaces of the inboard arm segments 44 in arcs extending generally towards the outlet of the sleeve 18 adjacent to the axis line 50. As noted previously, the nut fastener 10 may be used to establish a connection between a panel 24 and a covering panel 40. To establish such a connection, the nut fastener 10 as illustrated in FIGS. 1, 2, and 5, is inserted into a panel 24 to establish a relation as shown in FIG. 4. The covering panel 40 is thereafter placed in overlying relation to the panel 24 with the platform 12 of the nut fastener 14 held in sandwiched relation between the panel 24 and the covering panel 40 thereby establishing a relationship as illustrated in FIG. 6.

Upon completion of the initial insertion of the nut fastener 10 through the panel opening 26, the outboard arm segments 46 are biased outwardly by the spring action provided by the intermediate elbow segments 48. This biasing urges the panel engagement zones 64 towards contacting relation with the adjacent perimeter segments of the panel 24. In this configuration as shown in FIG. 6, the notches 66 may act as barbs to block against easy withdrawal of the nut fastener 10.

To adjoin the panel 24 to the covering panel 40, an elongate fastening member 74 such as a bolt, screw, or the like is passed through an opening in the covering panel 40 aligned with the sleeve 18. During this insertion, the generally bowl shaped configuration of the draw opening depression 32 (FIG. 1) may facilitate blind insertion and alignment. As may be understood through reference to FIG. 7, as the elongate fastening member 74 is inserted through the sleeve 18, the biasing arms 70 are engaged. The application of downward force by the elongate fastening member 74 causes the biasing arms 70 to be pushed away from axis line 50. Such movement of the biasing arms 70 is translated to the retention arms 20 which move outwardly as shown towards a more vertical orientation relative to the platform 12. As will be appreciated, due to the presence of the biasing arms 70 projecting to positions substantially above the intermediate elbow segments 48, movement of the retention arms 20 is initiated at an early stage yielding enhanced outboard rotation of the retention arms.

As seen in FIG. 7, the outward movement of the retention arms 20 causes the panel engagement zones 64 to press into adjacent surfaces of the panel 24 thereby facilitating a secure locked relation. In this regard, the notches 66 will cradle perimeter edge portions of the panel opening 26. In the illustrated arrangement, the panel 24 has a thickness which is greater than the height of the notches 66. In this configuration, the notches 66 lock around the lower corner portions of the panel 24 at the perimeter of the panel opening 26. In the event that the panel 24 has a thickness which is less than the height of the notches 66, the notches 66 may capture substantially the entire thickness of the panel 24 at the perimeter of the panel opening 26. The secure relation between the panel engagement zones 64 and the panel 24 is thereafter maintained so long as the elongate fastening member 74 is in place.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims

What is claimed is:

1. A nut fastener adapted for insertion into an opening in a panel, the nut fastener comprising:
   a platform including an upper face and a lower face;
   a sleeve defining a sleeve axis extending through the platform, the sleeve including a sleeve inlet opening at the upper face adapted to receive an elongate fastening member along the sleeve axis;
   a first retention arm extending downwardly from a first position on the platform; and
   at least a second retention arm extending downwardly from a second position on the platform, the first position and the second position being disposed on substantially opposing sides of the sleeve axis, the first retention arm and the second retention arm including biasing arms projecting away from inboard surfaces of the first retention arm and the second retention arm towards the sleeve axis, the biasing arms being adapted to engage the elongate fastening member during insertion of the elongate fastening member through the sleeve to rotate the first retention arm and the second retention arm to outboard positions, and wherein said platform includes an elongate rib member disposed in intersecting relation to said sleeve inlet opening, said elongate rib member having a concave profile across said upper face.

2. The nut fastener as recited in claim 1, wherein said platform includes a plurality of raised dimples.

3. The nut fastener as recited in claim 1, wherein at least one of the first retention arm and the second retention arm has a substantially U-shaped profile including an inboard arm segment operatively connected to an outboard arm segment, the inboard arm segment extending downwardly away from the lower face of the platform in angled relation towards the sleeve axis, and the outboard arm segment extending upwardly in angled relation away from the sleeve axis.

4. The nut fastener as recited in claim 3, wherein each of the first retention arm and the second retention arm has a substantially U-shaped profile including an inboard arm segment operatively connected to an outboard arm segment, the inboard arm segment extending downwardly away from the lower face of the platform in angled relation towards the sleeve axis, and the outboard arm segment extending upwardly in angled relation away from the sleeve axis.

5. The nut fastener as recited in claim 3, wherein the outboard arm segment extends to an enhanced width terminal head portion including a cross member defining a substantially T-shaped intersection with a lower portion of the outboard arm segment, the terminal head portion further including a pair of lateral wing segments oriented in planes transverse to the cross member, the lateral wing segments including panel engagement surfaces angled upwardly away from the cross member, the panel engagement surfaces facing generally outboard, away from the sleeve axis.

6. The nut fastener as recited in claim 5, wherein at least one of the panel engagement surfaces includes at least one notch adapted to engage at least a portion of the panel when said at least one of the first retention arm and the second retention is moved away from the sleeve axis.

7. The nut fastener as recited in claim 1, wherein at least one of the first retention arm and the second retention arm has a substantially U-shaped profile including an inboard arm segment, an outboard arm segment and an intermediate elbow segment disposed in connecting relation between the inboard arm segment and the outboard arm segment, the inboard arm segment extending downwardly away from the lower face of the platform in angled relation towards the sleeve axis, and the outboard arm segment extending upwardly in angled relation away from the sleeve axis, the intermediate elbow segment defining a compressible spring connection between the inboard arm segment and the outboard arm segment.

8. The nut fastener as recited in claim 1, wherein each of the first retention arm and the second retention arm has a substantially U-shaped profile including an inboard arm segment, an outboard arm segment and an intermediate elbow segment disposed in connecting relation between the inboard arm segment and the outboard arm segment, the inboard arm segment extending downwardly away from the lower face of the platform in angled relation towards the sleeve axis, and the outboard arm segment extending upwardly in angled relation away from the sleeve axis, the intermediate elbow segment defining a compressible spring connection between the inboard arm segment and the outboard arm segment.

9. A nut fastener adapted for insertion into an opening in a panel, the nut fastener comprising:
   a platform including an upper face and a lower face;
   a sleeve defining a sleeve axis extending through the platform, the sleeve including a sleeve inlet opening at the upper face adapted to receive an elongate fastening member along the sleeve axis;
   a multi-segment elongate rib member disposed in spanning relation to the sleeve inlet opening, the multi-segment elongate rib member having a concave profile across said upper face, the elongate rib member including a first segment and a second segment opening into opposing sides of the sleeve inlet opening;
   a first retention arm of flexible character extending downwardly from a first position adjacent a first lateral edge of said platform; and
   at least a second retention arm of flexible character extending downwardly from a second position adjacent a second lateral edge of the platform, the first position and the second position being disposed on substantially opposing sides of the sleeve axis.

10. The nut fastener as recited in claim 9, wherein said platform includes a plurality of raised dimples.

11. The nut fastener as recited in claim 9, wherein at least one of the first retention arm and the second retention arm has a substantially U-shaped profile including an inboard arm segment operatively connected to an outboard arm segment, the inboard arm segment extending downwardly away from the lower face of the platform in angled relation towards the sleeve axis, and the outboard arm segment extending upwardly in angled relation away from the sleeve axis.

12. The nut fastener as recited in claim 11, wherein each of the first retention arm and the second retention arm has a substantially U-shaped profile including an inboard arm segment operatively connected to an outboard arm segment, the inboard arm segment normally extending downwardly away from the lower face of the platform in angled relation towards the sleeve axis, and the outboard arm segment normally extending upwardly in angled relation away from the sleeve axis.

13. The nut fastener as recited in claim 11, wherein the outboard arm segment extends to an enhanced width terminal head portion including a cross member defining a substantially T-shaped intersection with a lower portion of the outboard arm segment, the terminal head portion further including a pair of lateral wing segments oriented in planes transverse to the cross member, the lateral wing segments including panel engagement surfaces angled upwardly away from the cross member, the panel engagement surfaces facing generally outboard, away from the sleeve axis.

14. The nut fastener as recited in claim 13, wherein at least one of the panel engagement surfaces includes at least one notch adapted to engage at least a portion of the panel when said at least one of the first retention arm and the second retention is moved away from the sleeve axis.

15. The nut fastener as recited in claim 14, wherein at least one of the first retention arm and the second retention arm has a substantially U-shaped profile including an inboard arm segment, an outboard arm segment and an intermediate elbow segment disposed in connecting relation between the inboard arm segment and the outboard arm segment, the inboard arm segment extending downwardly away from the lower face of the platform in angled relation towards the sleeve axis, and the outboard arm segment extending upwardly in angled relation away from the sleeve axis, the intermediate elbow segment defining a compressible spring connection between the inboard arm segment and the outboard arm segment.

16. The nut fastener as recited in claim 14, wherein each of the first retention arm and the second retention arm has a substantially U-shaped profile including an inboard arm segment, an outboard arm segment and an intermediate elbow segment disposed in connecting relation between the inboard arm segment and the outboard arm segment, the inboard arm segment extending downwardly away from the lower face of the platform in angled relation towards the sleeve axis, and the outboard arm segment extending upwardly in angled relation away from the sleeve axis, the intermediate elbow segment defining a compressible spring connection between the inboard arm segment and the outboard arm segment.

17. A nut fastener adapted for insertion into an opening in a panel, the nut fastener comprising:

a platform including an upper face and a lower face;

a sleeve defining a sleeve axis extending through the platform, the sleeve including a sleeve inlet opening at the upper face adapted to receive an elongate fastening member along the sleeve axis;

a multi-segment elongate rib member disposed in spanning relation to the sleeve inlet opening, the multi-segment elongate rib member having a concave profile across said upper face, the elongate rib member including a first segment and a second segment opening into opposing sides of the sleeve inlet opening;

a first retention arm extending downwardly from a first position on the platform; and at least a second retention arm extending downwardly from a second position on the platform, the first position and the second position being disposed on substantially opposing sides of the sleeve axis, the first retention arm and the second retention arm including biasing arms projecting away from inboard surfaces of the first retention arm and the second retention arm towards the sleeve axis, the biasing arms being adapted to engage the elongate fastening member during insertion of the elongate fastening member through the sleeve.

18. The nut fastener as recited in claim 17, wherein at least one of the first retention arm and the second retention arm has a substantially U-shaped profile including an inboard arm segment, an outboard arm segment and an intermediate elbow segment disposed in connecting relation between the inboard arm segment and the outboard arm segment, the inboard arm segment extending downwardly away from the lower face of the platform in angled relation towards the sleeve axis, and the outboard arm segment extending upwardly in angled relation away from the sleeve axis, the intermediate elbow segment defining a compressible spring connection between the inboard arm segment and the outboard arm segment wherein the outboard arm segment extends to an enhanced width terminal head portion including a cross member defining a substantially shaped intersection with a lower portion of the outboard arm segment, the terminal head portion further including a pair of lateral wing segments oriented in planes transverse to the cross member, said planes being in substantial alignment with opposing cut-outs in the platform, the lateral wing segments including panel engagement surfaces angled upwardly away from the cross member, the panel engagement surfaces facing generally outboard, away from the sleeve axis.

19. The nut fastener as recited in claim 18, wherein at least one of the panel engagement surfaces includes at least one notch adapted to engage at least a portion of the panel when said at least one of the first retention arm and the second retention is moved away from the sleeve axis.

* * * * *